INVENTOR:
D.E. PERRY

BY Young and Quigg

ATTORNEYS

United States Patent Office 3,581,341
Patented June 1, 1971

3,581,341
GATE SHUT-OFF DEVICE FOR FOAM MOLDING
Dan E. Perry, Bartlesville, Okla., assignor to
Phillips Petroleum Company
Filed Feb. 6, 1969, Ser. No. 797,120
Int. Cl. B29d 27/04
U.S. Cl. 18—5                                   6 Claims

ABSTRACT OF THE DISCLOSURE

An apparatus for closing the gate of a mold used in foam molding. The apparatus comprises a pair of opposed closure members located on opposite sides of the gate. The closure members are normally disposed in a closed position and are movable to an open position responsive to the insertion of an extrusion lance through the gate.

BACKGROUND AND SUMMARY OF THE INVENTION

This invention relates to foam plastics. In one aspect it relates to an improved mold shutoff apparatus used in foam molding processes.

Currently there is in commercial use a variety of foam molding techniques which make foam products characterized as low density, light weight, low thermal conductivity, low dielectric constant, etc. Such products find application in diverse fields ranging from rigid toys to flexible padding.

The foam molding technique generally involves plasticizing a thermoplastic material, admixing the thermoplastic material with a foaming agent, extruding the melt through a die into a mold, and permitting the extrudate to expand against the contour of the molds forming a low density product of substantially the configuration of the mold. A recent modification of the conventional process locates the extrusion die at the outer end of an elongate lance. The lance is inserted through the mold gate and positioned generally along the axis of the mold cavity with the extrusion die being located near the closed end of the mold cavity. The mold is moved axially in relation to the lance so that the rate of withdrawal of the lance is in timed relation to the extrusion rate or the rate at which the cavity is being filled. Now, when the extrusion die clears the mold, the extrusion is discontinued and means are provided for closing the mold gate. The gate must be closed to prevent spewing of the foam material in the proximity thereof. Spewing or expansion of the foamed material through the opening results in a nonuniform product density. Conventional foam molding techniques presently employ plugs for closing the gate, but this approach has the disadvantage of requiring an additional step in the molding process. Furthermore, the plugs frequently produce burs in the product neck area which requires a post trimming operation.

The purpose of the present invention is therefore to provide a foam molding apparatus with an automatic gate shut-off valve. The valve is disposed in the gate area and is operatively responsive to the presence of the lance. Insertion of the lance into the mold cavity automatically opens the gate and withdrawal of the lance automatically closes the valve. The valve includes closure members which move between the open and closed positions in a direction perpendicular to the axis of the gate thus providing a squared clean severance of the foam in the mold cavity.

An object of this invention is then to provide an apparatus for molding a uniform density foamed product. Another object is to prevent post extrusion spewing of the molded foam.

DRAWINGS

DESCRIPTION OF THE PREFERRED EMBODIMENT

Figure 1:
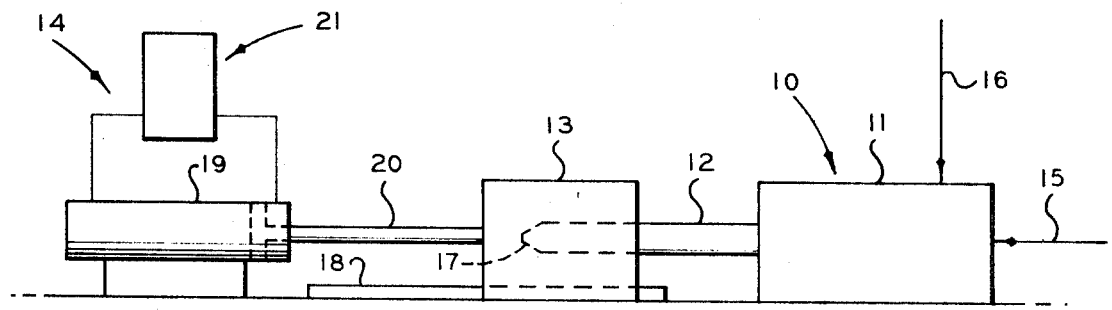
FIG. 1 is a diagrammatic illustration of the foam molding system incorporating the apparatus of the present invention.

As shown in FIG. 1, the foam molding system includes an extruder apparatus 10 having an extruder barrel 11 and a projecting lance 12, a mold 13, and power means 14 for moving the mold relative to the lance 12. A thermoplastic material such as polymers and/or copolymers of 1-olefins is fed into the barrel 11 via line 15 and a foaming agent such as ammonium carbonate is fed into the barrel via line 16. The thermoplastic material and foaming agent are admixed in the extrusion barrel 11 and conveyed by a conventional screw conveyor (not shown) through the barrel 11, through the lance 12 and extruded through a die 17 located at the outer extremity of lance 12.

The mold 13 is slidably mounted on a pair of guides, one shown as 18. The power means 14 serves to move the mold 13 in timed relation to the extrusion rate so that the mold cavity is uniformly filled as the mold 13 is moved away from lance 12. The power means 14 includes a double acting hydraulic cylinder 19 having a piston rod 20 connected to the mold 13, and control means shown generally as 21 for selectively directing hydraulic flow to opposite ends of cylinder 19 thereby imparting reciprocatory movement to mold 13.

The operation of the extrusion apparatus 14 is described in detail in U.S. Pat. 3,342,913, issued to T. P. Engel and dated Sept. 19, 1967. While the present invention is described in connection with the Engelit foaming process for making polyolefins foams, it should be observed that the apparatus decribed and claimed herein may also be used in other foam molding processes using other thermoplastic materials such as polystyrene, urethane, vinyl compounds, phenolic, silicones, cellular cellulose acetate, and the like.

Figure 2:
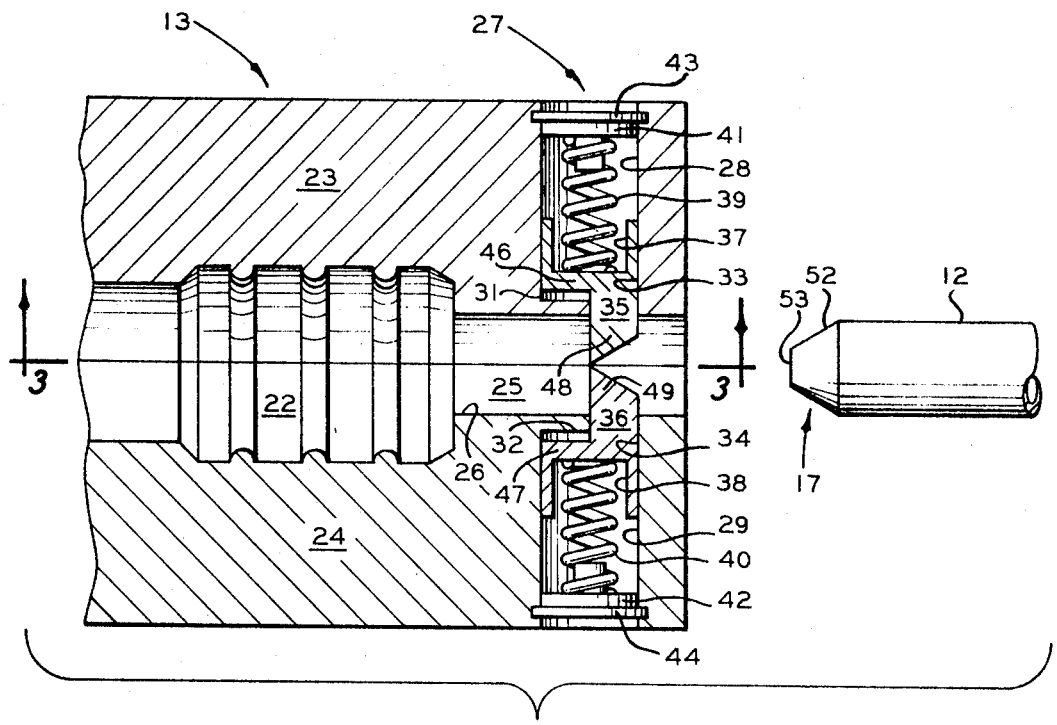
FIG. 2 is an enlarged fragmentary sectional view of the mold and mold shutoff apparatus constructed according to this invention.
Figure 3:
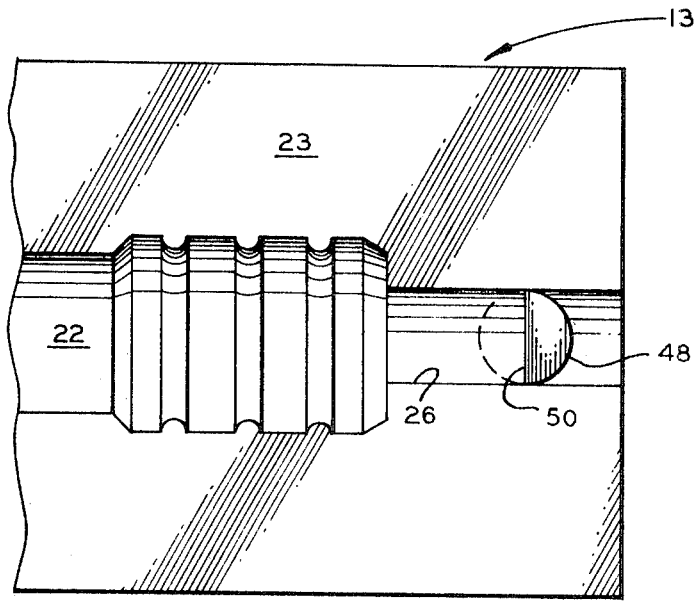
FIG. 3 is a sectional view of the apparatus shown in FIG. 2, the cutting plane taken generally along the line indicated by 3—3.
Figure 4:
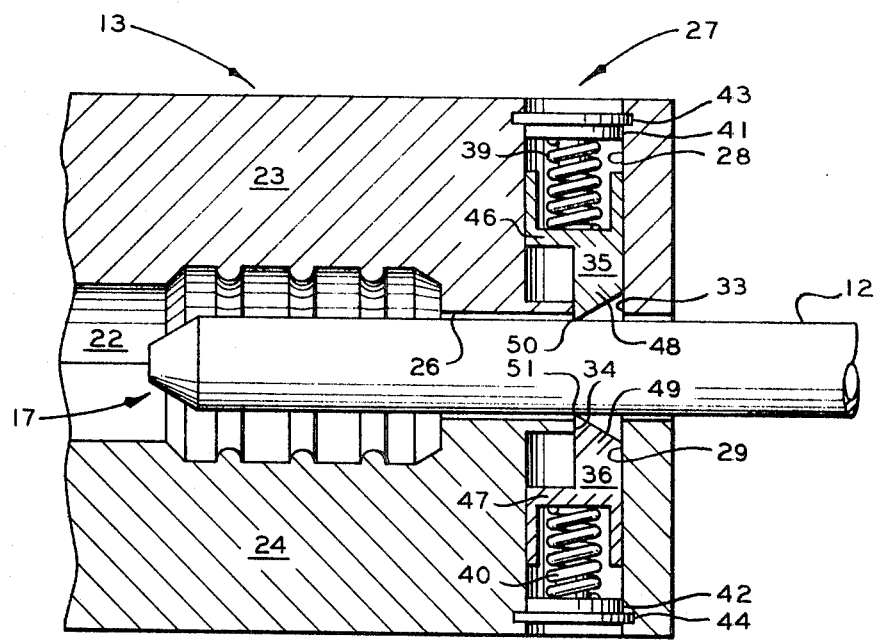
FIG. 4 is a sectional view of the apparatus illustrating the relationship of the lance and mold during the extrusion phase of the molding cycle.

As shown in FIG. 2, the mold 13 includes mold halves 23 and 24 which in assembled relation define an internal cavity 22 having a neck portion 25 defined by mold gate 26. The diameter of gate 26 is slightly larger than the external diameter of lance 12 and is aligned therewith so that axial movement of the mold 13 permits the lance 12 to extend through the opening 26 and substantially through the entire length of the cavity 22 (see FIG. 4).

In order to completely enclose the cavity 22 following the extrusion of the foam in cavity 22, the mold 13 is provided with a gate shut-off valve, shown generally as 27 for closing the gate 26. Each mold half 23 and 24 is provided with outwardly opening and diametrically aligned recesses 28 and 29, respectively. Each recess 28, 29 is bottomed by a semicircular land portion 31 and 32, respectively. Openings 33 and 34 of semicircular cross section interconnect the gate 26 and the recesses 28 and 29, respectively. The recesses 28 and 29, respectively, slidably receive plugs 35 and 36. Each of the plugs 35 and 36 have outwardly opening recesses 37 and 38 for receiving compression springs 39 and 40, respectively. The inner ends of the compression springs 39 and 40 engage the bottom of recesses 37 and 38, respectively, and their outer ends engage spring retainers 41 and 42, respectively, which are maintained in fixed relation by snap rings 43 and 44, respectively, The plugs 35 and 36, respectively, have circular body portions 46 and 47 particularly sized to provide a sliding fit in their corresponding recesses 28 and 29. Extending inwardly from the body portions 46 and 47 and through the openings 33 and 34 are closure members 48 and 49, respectively. The closure members 48 and 49 are semicircular in cross section conforming to the configuration of the openings 33 and 34. The outer ends of the closure members 48 and 49, respectively, are tapered inwardly and terminate in complementary shaped straight edges 50 and 51 along the flat side of the semicircular members. In the closed position of the valve 27, the straight edges 50 and 51 are joined in abutting relation thereby closing gate 26. The outer end of the lance 12 which defines the die opening 17 is beveled defining a frustoconical section 52 and a flat end ennular section 53. The outer diameter of the annular section 53 is aligned to engage an intermediate point on the tapered end sections of closure members 48 and 49. Preferably, the taper of the frustoconical section 52 of lance 12 should conform to the taper of closure members 48 and 49 so that the latter will have a wiping effect when the former is moved therepast.

In operation, let it be assumed that the mold 13 is placed in axial alignment with the lance 12 at the commencement of the foam molding operation. The mold 13 is moved toward the extruding apparatus 10 by the action of cylinder 19. The annular section 53 of lance 12 engages the tapered closure members 48 and 49 forcing the plugs 35 and 36 apart against the bias of springs 39 and 40. Continued axial movement of the mold 13 moves the frustoconical section 53 past the closure members 48 and 49 forcing the plugs 35 and 36 still further outwardly within their confining recesses 28 and 29. When the full diameter of lance 12 is reached, the plugs 35 and 36 are fully retracted within the recesses (see FIG. 4). The mold 13 is moved toward apparatus 10 until the extrusion die 17 is located near the closed end of the mold 13 (see FIG. 1). The extrusion is begun and the mold 13 is moved axially away from the extrusion apparatus 10 at the rate substantially the same as the filling rate of the cavity 13. The engagement of the edges 50 and 51 on the lance 12 maintains the plugs 35 and 36 in the retracted position. Extrusion from the die 17 is discontinued just prior to the lance 12 clearing the closure plane defined by straight edges 50 and 51. Now when the lance 12 clears the closure members 48 and 49, the plugs 35 and 36 are forced inwardly toward each other by the action of the compression springs 39 and 40 moving straight edges 50 and 51 into abutting engagement thereby sealing the cavity 22. Thus the foamed thermoplastic material in cavity 22 is constrained on all sides so that expansion will be uniform, thereby providing a uniform density product. Since the movement of the closure members 48 and 49 is in a direction perpendicular to the axis of the gate 26, the movement thereof to the closed position separates the foamed material confined within the cavity 22 from drool exuding from the lance 12 and provides a squared gate closure.

While the valve 27 of this invention has been described as being mounted in a portion of the mold, it may be mounted in a separate frame for attaching to a mold. In summary, then, it has been demonstrated that the apparatus of this invention effectively seals the gate of a mold cavity thereby ensuring uniform expansion of the thermoplastic material confined therein which produces a product of uniform density.

I claim:
1. In a foam molding apparatus of the type having a mold defining an internal cavity provided with a gate, extrusion means including an elongate lance having an extrusion die in its outer end, and means for imparting relative movement to said mold and said lance whereby said lance may be moved into and out of said cavity, the improvement wherein said mold includes a valve having gate closure means located adjacent said gate, said valve being movable to a closed position wherein said closure means substantially spans said gate, and an open position wherein said closure means is substantially removed from said gate; and means for moving said valve to said closed position in response to said lance being located outside of said cavity; and means for moving said valve to said open position in response to said lance entering said cavity.

2. The invention as recited in claim 1 wherein said valve includes a pair of closure members slidably mounted in said mold and having complementary shaped surfaces, said means for closing said valve being operative to move said members into abutting relation in said gate, and said means for opening said valve being operative to move said members in spaced apart relation.

3. The invention as recited in claim 2 wherein the movement of the closure members between the abutting relation to the spaced apart relation is in a direction perpendicular to the axis of said gate.

4. In a foam molding apparatus having a mold defining an internal cavity and a mold gate, extrusion means including an elongate lance having an extrusion die in its outer end, and means for imparting relative movement to said mold and lance whereby said lance may be moved into and out of said gate and cavity, the improvement comprising a pair of closure members mounted on said mold adjacent said gate and having complementary shaped end surfaces, said members being normally disposed with said complementary shaped surfaces in abutting relation thereby closing said gate, and being yieldably movable in a direction perpendicular to the axis of said gate to an open position wherein said complementary shaped surfaces are disposed in spaced apart relation.

5. The invention as recited in claim 4 wherein said closure members are each configurated to provide a closure surface extending perpendicularly across said gate with said members disposed in abutting relation, each of said closure members also including a surface tapering outwardly from its respective complementary shaped surface, each of said tapered surfaces with said members in said abutting relation being aligned with the outer end of said lance so that relative movement of said lance into said gate engages said tapered surfaces forcing said closure members apart toward said open position.

6. The invention as recited in claim 5 wherein said outer end of said lance has a frustoconical section tapering substantially at the same angle of the tapering surfaces of said closure members, said frustoconical section being aligned with said tapered surfaces so that a line contact is provided for the engagement of said lance on said tapered surfaces of said closure members.

References Cited

UNITED STATES PATENTS 3,164,860  1/1965  Oxel ................ 18—5
3,306,960  2/1967  Weissman et al. ...... 18—5X H. A. KILBY, Jr., *Primary Examiner*